United States Patent
Yang et al.

(10) Patent No.: US 8,880,335 B2
(45) Date of Patent: Nov. 4, 2014

(54) NAVIGATING SYSTEM WITH RFID FUNCTION AND RELATED METHOD THEREOF

(75) Inventors: Chao-Tung Yang, Tai-Nan (TW); ShouFang Chen, Hsin-Chu Hsien (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 977 days.

(21) Appl. No.: 11/947,787

(22) Filed: Nov. 30, 2007

(65) Prior Publication Data

US 2008/0167815 A1 Jul. 10, 2008

Related U.S. Application Data

(60) Provisional application No. 60/883,511, filed on Jan. 4, 2007.

(51) Int. Cl.
*G01C 21/00* (2006.01)
*G08G 1/123* (2006.01)
*G01C 21/34* (2006.01)
*G01S 19/05* (2010.01)

(52) U.S. Cl.
CPC ............... *G01C 21/005* (2013.01); *G01S 19/05* (2013.01)
USPC ........... 701/412; 701/400; 701/408; 701/409; 701/410; 340/12.51; 340/13.26

(58) Field of Classification Search
USPC ......... 701/214, 400, 408, 409, 410, 412, 467, 701/468; 340/825.49, 10.1, 10.42, 10.52
See application file for complete search history.

(56) References Cited

U.S. PATENT DOCUMENTS

| | | | | |
|---|---|---|---|---|
| 5,983,161 A | * | 11/1999 | Lemelson et al. | 701/301 |
| 6,064,336 A | * | 5/2000 | Krasner | 342/357.05 |
| 6,275,773 B1 | * | 8/2001 | Lemelson et al. | 701/301 |
| 6,487,500 B2 | * | 11/2002 | Lemelson et al. | 701/301 |
| 6,650,997 B2 | * | 11/2003 | Funk | 701/207 |
| 7,576,657 B2 | * | 8/2009 | Duron et al. | 340/572.7 |
| 7,584,048 B2 | * | 9/2009 | Pham et al. | 701/208 |
| 7,640,104 B2 | * | 12/2009 | Ramaswamy et al. | 701/213 |
| 7,656,290 B2 | * | 2/2010 | Fein et al. | 340/539.13 |
| 2003/0080990 A1 | | 5/2003 | Lyness | |
| 2003/0212479 A1 | * | 11/2003 | Baghshomali et al. | 701/24 |
| 2004/0176906 A1 | * | 9/2004 | Matsubara et al. | 701/200 |
| 2006/0265123 A1 | * | 11/2006 | Chon et al. | 701/209 |
| 2008/0114541 A1 | * | 5/2008 | Shintani et al. | 701/209 |
| 2009/0224892 A1 | * | 9/2009 | Nicholls | 340/10.42 |

FOREIGN PATENT DOCUMENTS

| | | |
|---|---|---|
| CN | 1548924 A | 11/2004 |
| CN | 1548925 A | 11/2004 |
| CN | 1808178 A | 7/2006 |
| EP | 1 124 110 A1 | 8/2001 |

(Continued)

OTHER PUBLICATIONS

Baseband circuits for an RFID receiver, Design notes 381, Philip Karantzalis, Linear Technology 2005.*

*Primary Examiner* — Rami Khatib
(74) *Attorney, Agent, or Firm* — Winston Hsu; Scott Margo

(57) ABSTRACT

A navigating system with RFID function includes a GPS module for receiving a plurality of satellite signals for location, and an RFID reader for receiving an RFID signal. The navigating system performs navigation according to a first position information and the location function of the GPS module if the RFID signal includes the first position information.

3 Claims, 4 Drawing Sheets

(56) References Cited

FOREIGN PATENT DOCUMENTS

| | | |
|---|---|---|
| JP | 5265374 | 10/1993 |
| JP | 2001116583 | 4/2001 |
| JP | 200387847 | 3/2003 |
| KR | 1020020077915 | * 10/2005 |
| TW | 465212 | 11/2001 |
| TW | 200625176 | 7/2006 |
| WO | 2006059818 A1 | 6/2006 |

* cited by examiner

NAVIGATING SYSTEM WITH RFID FUNCTION AND RELATED METHOD THEREOF

CROSS REFERENCE TO RELATED APPLICATIONS

This application claims the provisional application, which is U.S. Provisional Application No. 60/883,511, filed Jan. 4, 2007 and is included herein by reference.

BACKGROUND OF THE INVENTION

1. Field of the Invention

The present invention relates to navigating systems and related methods, and more particularly, to navigating systems with RFID function and related methods.

2. Description of the Prior Art

By the advancement of global positioning system (GPS), more cars offer built-in GPS navigating systems, and some portable electronic devices (such as cell phones and PDAs) also integrate GPS functions. The GPS functions in these portable electronic devices, however, are always limited. For example, the GPS systems in these portable electronic devices are not a main function, but rather an auxiliary function, and therefore, the navigating chip or the operative software does not have high efficiency, and mistaken judgments are common. Also, the screens on these portable electronic devices are small and are inconvenient for users to read, especially when the users are car drivers. Therefore, if there is a mechanism to make these electronic devices communicate with an another more efficient navigating system, and the more efficient navigating system can use the positioning information received by these portable electronic devices, the navigating system will be more convenient and its applications broader.

SUMMARY OF THE INVENTION

It is therefore an objective of the present invention to provide a navigating system with radio frequency identification (RFID) function and related method, where the navigating system can utilize the RFID function to receive position information transmitted from other electronic devices and perform navigating according to the position information.

A navigating system with RFID function is disclosed according to one embodiment of the present invention. The navigating system comprises a global positioning system (GPS) module for receiving a plurality of satellite signals for performing positioning; and an RFID reader for receiving an RFID signal. When the RFID signal comprises first position information, the navigating system performs navigation according to the first position information and the positioning function of the GPS module.

A navigating system with RFID function is disclosed according to another embodiment of the present invention. The navigating system comprises a GPS module for receiving a plurality of satellite signals for performing positioning, a storage device coupled to the GPS module for storing data, and an RFID tag coupled to the storage device for receiving an RFID signal and storing the data comprised in the RFID signal into the storage device. When the data comprised in the RFID signal is first position information, the navigating system performs navigation according to the first position information and the positioning function of the GPS module.

A navigating method utilizing RFID function is disclosed according to another embodiment of the present invention, and the navigating method comprises receiving a first RFID signal wherein the first RFID signal comprises first position information, receiving a plurality of satellite signals for performing positioning, and performing navigation according to the first position information and the positioning result.

According to mechanisms provided by the present invention, the navigating system can receive the position information from other electronic devices, and allow the navigating skills to be applied more broadly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
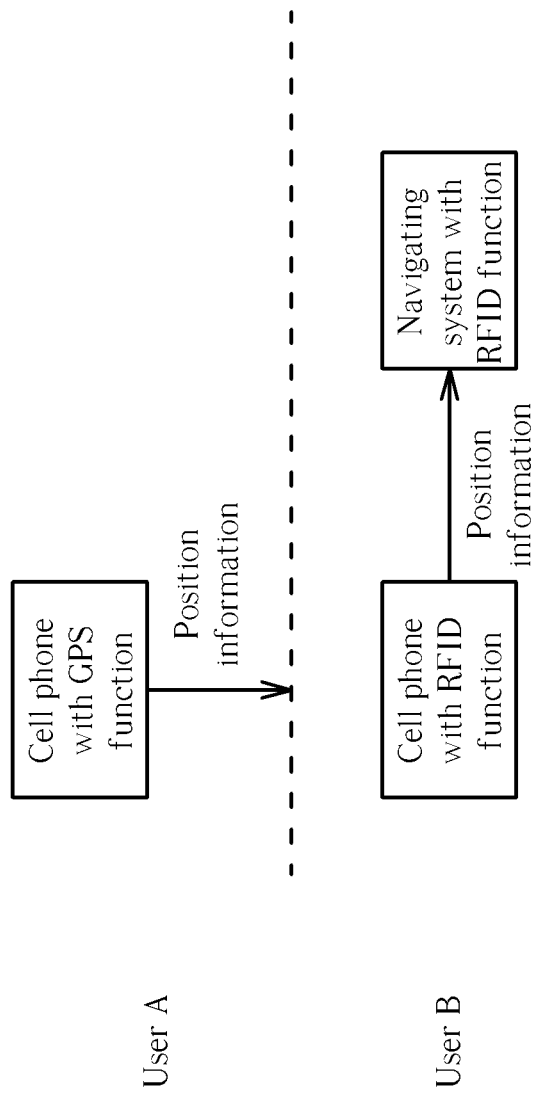
FIG. 1 is a diagram illustrating a navigating system with an RFID function to receive position information from a cell phone.

FIG. 1 is a diagram illustrating a navigating system with an RFID function to receive position information from a cell phone. As shown in FIG. 1, a user A has a cell phone integrated with a GPS function, and the user A is in a specific position and wishes to have user B come to the specific position. Therefore, the user A transmits position information detected by the cell phone to the user B (e.g., in a message or email). However, although the user B receives the positioning information, his cell phone only has RFID functions but not GPS functions and, therefore, his cell phone is incapable of navigating to the specific position. However, the user B can transmit the position information to a navigating system with an RFID function by using the RFID function in the cell phone, and then use the navigating system to navigate to the specific position where user A is. Or, user B's cell phone has GPS functions built-in, but the screen is too small for drivers to properly and safely view. At this time, the user B can also transmit the position information to the navigating system with RFID function by using RFID function, and uses a navigating system with larger screen and more functions. It should be noted that the cell phone shown in FIG. 1 is for exemplary purposes, and is not limiting the present invention. The navigating system with RFID function provided by the present invention can receive position information transmitted from any electronic devices with RFID function. And the method of use of the navigating system is not limited by the method shown in FIG. 1. The detailed structures of the navigating system disclosed by the embodiments of the present invention are described as follows.

Figure 2:
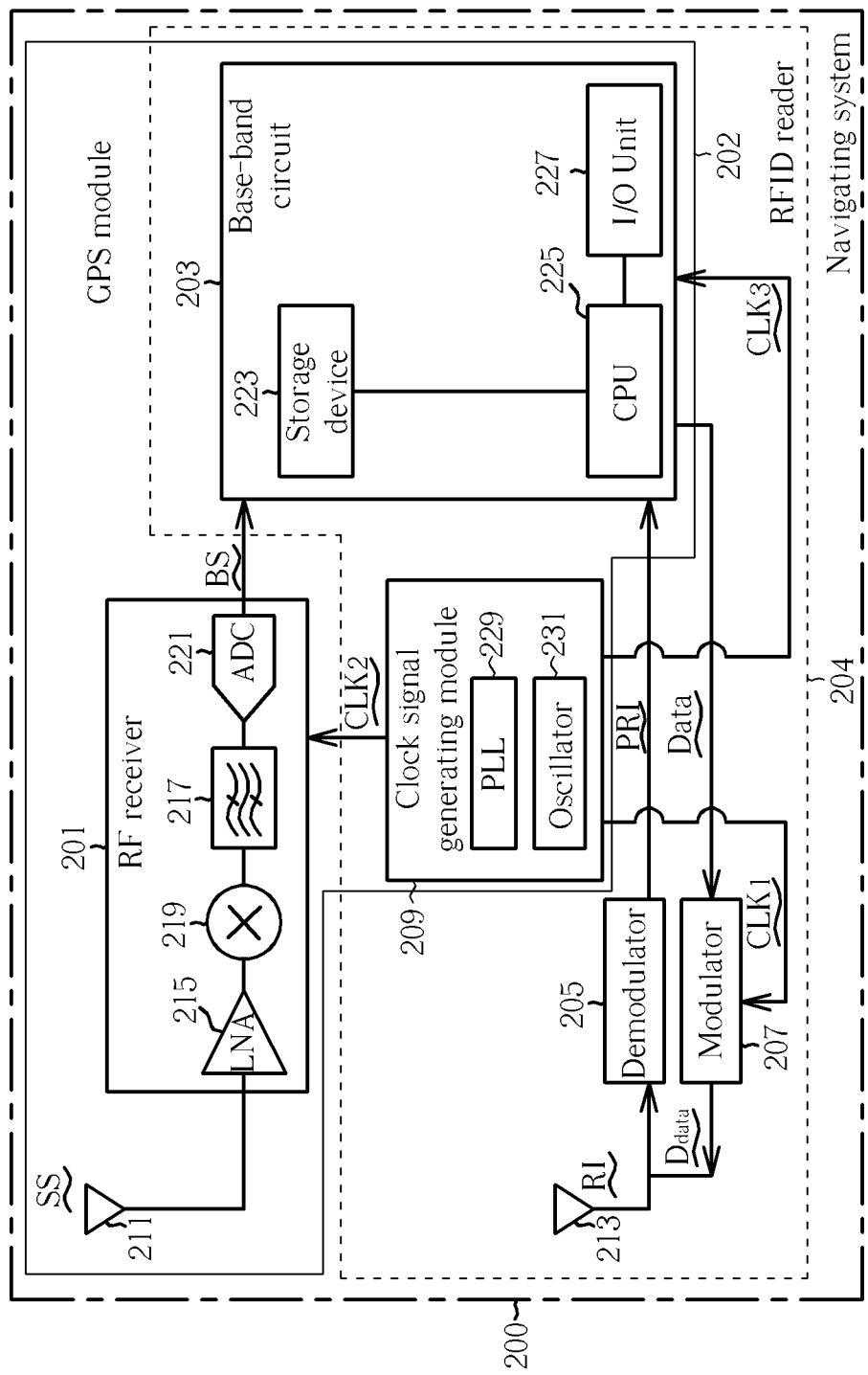
FIG. 2 illustrates a navigating system with RFID function according to a first embodiment of the present invention.

FIG. 2 illustrates a navigating system 200 with RFID function according to a first embodiment of the present invention. As shown in FIG. 2, the navigating system 200 comprises a RF receiver 201, a base-band circuit 203, a demodulator 205, a modulator 207, a clock signal generating module 209, and antennas 211 and 213. The antenna 211, the RF receiver 201, the clock signal generating module 209, and the base-band circuit 203 constitute the GPS module 202, and the antenna 213, the demodulator 205, the modulator 207, the clock signal generating module 209, and the base-band circuit 203 further constitute an RFID reader 204, where the clock signal generating module 209 and the base-band circuit 203 are shared by the GPS module 202 and the RFID reader 204. It should be noted that, the detailed components of the GPS module 202 and the RFID reader 204 are not limited by this embodiment, the GPS module 202 and the RFID reader 204 with other structures are in the scope of the present invention.

For the GPS module 202, the RF receiver 210 is used to receive a plurality of satellite signals SS from the antenna 211 to generate a base-band signal BS. The base-band circuit 203 is utilized to perform positioning according to the base-band signal BS. Generally speaking, the RF receiver 201 may comprise a low noise amplifier (LNA) 215, a band-pass filter 217 (which can also be a surface acoustic wave filter), a mixer 219, and an analog-to-digital converter 221. The base-band circuit 203 may comprise a storage device 223, a central process unit (CPU) 225, and an input-output unit (I/O unit) 227. The CPU 225 is used to calculate the position according to the base-band signal BS and access data from the storage device 223. The I/O unit 227 is controlled by the CPU 225 to input or output data from external device(s). Because other detailed operations of the GPS module 202 are known by a person skilled in this art, further descriptions are omitted here.

For the RFID reader 204, the demodulator 205 is used to demodulate an RFID signal RI received by the antenna 213 to generate a demodulated RFID signal PRI, and transmits the demodulated RFID signal PRI to the base-band circuit 203. Then the base-band circuit 203 performs operation to the demodulated RFID signal PRI. When the RFID reader 204 prepares to transmit the message(s), the base-band circuit 203 transmits a data signal Data to the demodulator 207, the modulator 207 modulates the data signal Data to output a modulated data signal Ddata, and the modulated data signal Ddata is broadcasted from the antenna 213.

When the GPS module 202 and the RFID reader 204 operate, the required clock signal is provided by the clock signal generating module 209. In the embodiment shown in FIG. 2, the clock signal generating module 209 provides clock signals $CLK_1$, $CLK_2$, and $CLK_3$ to the base-band circuit 203, RF receiver 201, and the modulator 207, respectively. In this embodiment, the clock signal generating module 209 can comprise a phase lock loop (PLL) circuit 221 and an oscillator 231, but it is not limiting the present invention.

In the above-mentioned navigating system 200, the navigating system 200 integrates the GPS module 202 and the RFID reader 204. Therefore, in the condition shown in FIG. 1, the user B can transmit the position information received by his cell phone to the navigating system 200 according to the RFID function built into the cell phone. After the navigating system 200 uses the RFID reader 204 to receive the position information, the navigating system 200 performs navigation by using its built-in map data and positioning functions of the GPS module. And the user can achieve the target position conveniently. In this embodiment, the GPS module 202 and the RFID reader 204 shares the base-band circuit 203, and the navigating system can further comprise a screen (not shown in FIG. 1) for displaying the position according to the position information and the built-in map data. In one embodiment, the received message(s) of the RFID reader 204 can be stored in the storage device 223 of the base-band circuit 203, and the navigating system 200 can also access and use the data stored in the storage device 223. In addition, the navigating system 200 can also use the GPS module to position to generate position information, and then use the RFID reader 204 to transmit the position information.

As known by the person skilled in this art, the RFID reader can read data of another RFID reader or an RFID tag. Therefore, the RFID signal RI of this embodiment is from an RFID reader or an RFID tag. Other detailed operations of the RFID reader are in the scope of the prior art, and therefore is omitted here.

Figure 3:
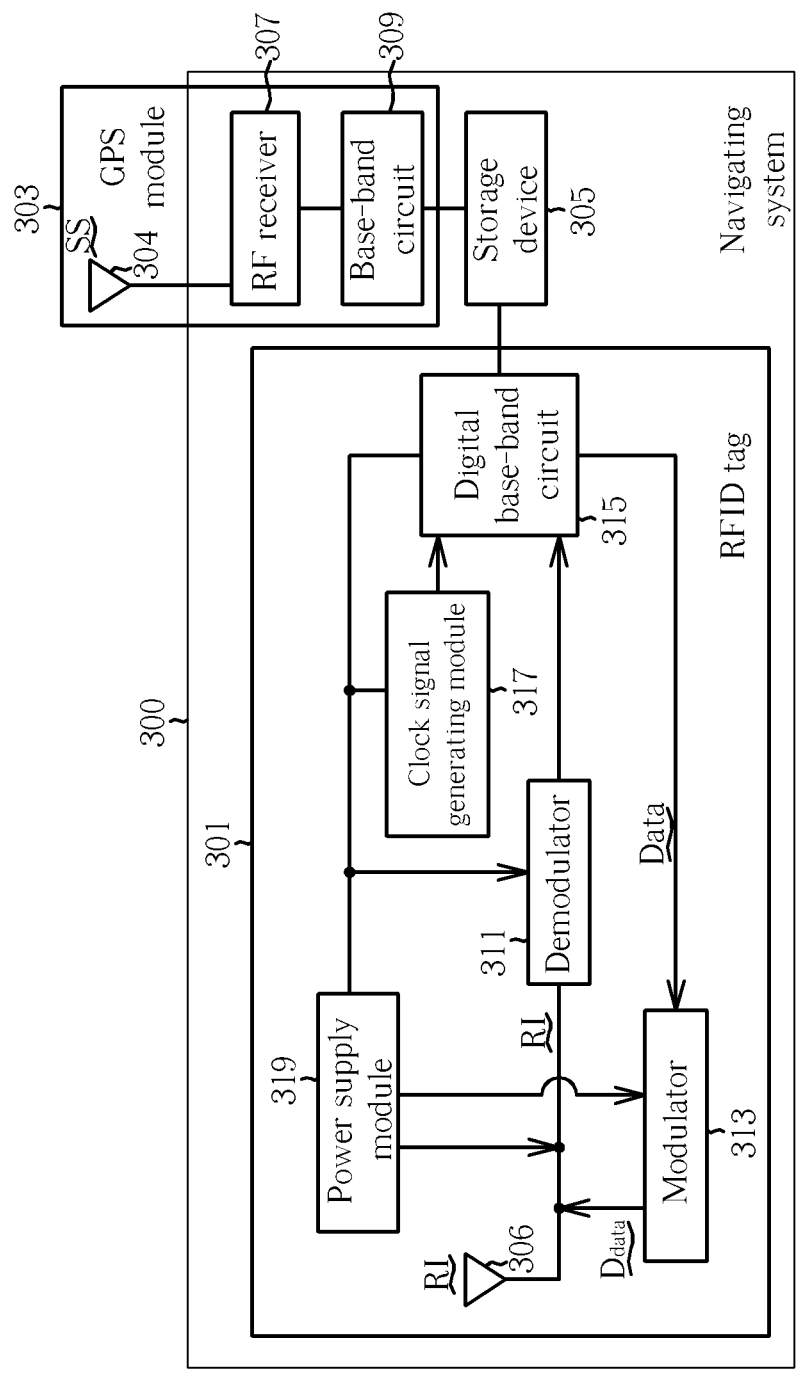
FIG. 3 illustrates a navigating system with RFID function according to a second embodiment of the present invention.

FIG. 3 illustrates a navigating system 300 with RFID function according to a second embodiment of the present invention. As shown in FIG. 3, the navigating system 300 comprises an RFID tag 301, a GPS module 303, and a storage device 305. The RFID tag 301 is used to receive an RFID signal RI, where the RFID signal RI may comprise a first position information, and the RFID tag 301 can store the first position information into the storage device 305. The GPS module 303 can receive a plurality of satellite signals SS to perform positioning, and read the first position information from the storage device 305. By using the first position information and the positioning function of the GPS module, the GPS module 303 can perform navigating. In addition, the GPS module 303 can also generate second position information according to the plurality of satellite signals SS, and store the second position information into the storage device 305.

The RFID tag 301 and the GPS module 303 can use the same storage device shown in FIG. 3, and can also use independent storage devices. For example, the RFID tag can comprise an internal storage device and store the first position information into this internal storage device, while the GPS module 303 stores the second position information into another storage device. The GPS module 303 can read the first position information from the internal storage device of the RFID tag 301 to perform navigating.

The GPS module 303 comprises an antenna 304, a RF receiver 307, and a base-band circuit 309. The RF receiver 307 is used to receive the plurality of satellite signals SS from the antenna 304 to generate a base-band signal. Then the base-band circuit 309 performs positioning according to the base-band signal. In addition, the base-band circuit 309 can store the second position information generated from the positioning into the storage device 305 (or another storage device).

The RFID tag 301 comprises an antenna 306, a demodulator 311, a modulator 313, a digital base-band circuit 315, and a clock signal generating module 317. The demodulator 311 is used to demodulate the RFID signal RI to generate a demodulated RFID signal PRI. The digital base-band circuit 315 is used to process the demodulated RFID signal PRI to store the first position information of the RFID signal RI into the storage device. As known by persons skilled in this art, for an RFID tag, the digital base-band circuit 315 is used to access the data in the storage device 305 according to a clock signal and the signal from the demodulator 311.

The modulator 313 is used to modulate a data signal Data from the digital base-band circuit 315 to generate a modulated data signal Ddata, and output the modulated data signal Ddata. The clock signal generating module 317 is used to provide at least one clock signal to the digital base-band circuit 315 and the modulator 313. To simplify the figure, the clock signal generating module 317 is shown in FIG. 3 as being only coupled to the digital base-band circuit 315.

A power supply module 319 is used to provide operating power to other devices. As known by persons skilled in this art, the power supply module of the RFID tag can be divided into active and passive power supply modules. The active power supply module includes a battery (or batteries), and actively provides operating power; the passive power supply module, however, generates operating power only according to RFID signal RI. These two types of the power supply modules can be used in the RFID tag shown in FIG. 3. In addition, in RFID technologies nowadays, an RFID tag can be written or read data by an RFID reader. Therefore, the RFID signal RI shown in FIG. 3 should be from an RFID reader. However, if in the future technologies, data in the RFID tags can communicate mutually, the RFID signal RI shown in FIG. 3 can also be from an RFID tag.

The above-mentioned navigating system 300 integrates the GPS module 303 and the RFID tag 301. Therefore, in the condition shown in FIG. 1, the user B can transmit the position information received by his cell phone to the navigating system 300 according to the RFID function built in the cell phone. After the navigating system 300 receives the position information by using the RFID tag 301, the navigating system 300 performs navigation by using the built-in map data and positioning function of the GPS module, and the user can achieve the target position conveniently. In addition, the navigating system 300 can also use the GPS module 303 to generate position information, and then use the RFID tag 301 to transmit the position information.

Figure 4:
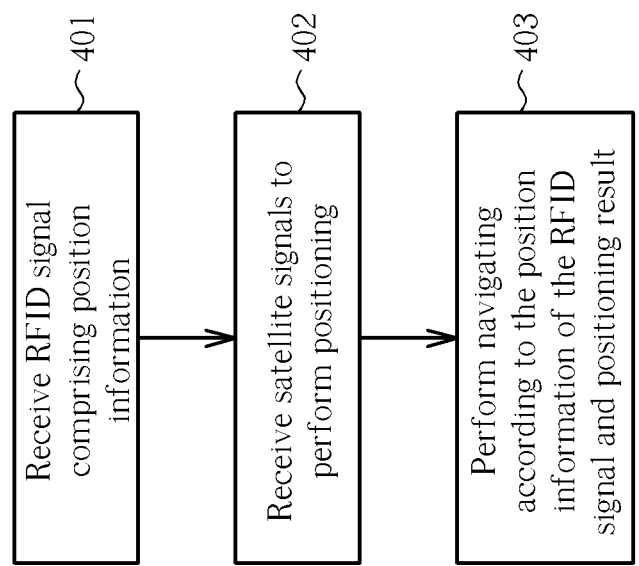
FIG. 4 illustrates a navigating method corresponding to the navigating system of the present invention.

FIG. 4 illustrates a navigating method corresponding to the navigating system of the present invention. As shown in FIG. 4, the navigating method comprises:

Step 401: Receive an RFID signal according to an RFID reader or an RFID tag, where the RFID signal includes position information, and the RFID reader or the RFID tag is integrated into a navigating system, and the RFID signal can be from another RFID reader or another RFID tag.

Step 402: Receive a plurality of satellite signals to perform positioning by utilizing a GPS module in the navigating system.

Step 403: Utilize map data built into the navigating system to perform navigating according to the position information of the RFID signal and a positioning result.

The step of the above-mentioned navigating method further includes storing the position information generated form the positioning of the GPS module, and utilizing the RFID reader or the RFID tag of the navigating system to transmit the position information.

As summarized, the present invention provides the navigating apparatus with RFID function and related method, and the user can share or receive the position information by the RFID function, therefore using the navigating apparatus is more conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A navigating system with radio frequency identification (RFID) function, comprising:
   a global positioning system (GPS) module, configured for receiving a plurality of satellite signals for performing positioning, and the GPS module comprises:
      a radio frequency (RF) receiver, configured for receiving the plurality of satellite signals to generate a base-band signal; and
      a first base-band circuit, coupled to the RF receiver, the first base-band circuit configured for performing positioning according to the base-band signal;
      wherein the first base-band circuit generates second position information according to the satellite signals received by the GPS module and store the second position information;
   a storage device, coupled to the GPS module, the storage device configured for storing data; and
   an RFID tag, coupled to the storage device, the RFID tag and the GPS module shares the storage device, the RFID tag configured for receiving an RFID signal generated from an external RFID reader disposed outside the navigating system, and storing the data comprised in the RFID signal into the storage device, and the RFID tag comprises a second base-band circuit, and the second base-band circuit is utilized for accessing the storage device and shares the storage device with the GPS module;
   wherein when the data comprised in the RFID signal is a first position information, the navigating system performs navigation according to the first position information and the positioning function of the GPS module;
   wherein the second position information generated by the GPS module is stored in the storage device, and the RFID tag reads the second position information from the storage device, and transmits the second position information to the external RFID reader.

2. The navigating system with RFID function of claim 1, wherein the RFID tag comprises:
   a demodulator, configured for demodulating the RFID signal to generate a demodulated RFID signal;
   the second base-band circuit, coupled to the demodulator, the second base-band circuit configured for processing the demodulated RFID signal;
   a modulator, coupled to the second base-band circuit, the modulator configured for modulating a data signal from the second base-band circuit to generate a modulated data signal, and outputting the modulated data signal;
   a clock signal generating module, coupled to the second base-band circuit and the modulator, the clock signal generating module configured for providing at least one clock signal to the second base-band circuit and the modulator; and
   a power supply module, configured for providing operating power to the demodulator, the second base-band circuit, the modulator, and the clock signal generating module.

3. The navigating system with RFID function of claim 2, wherein the power supply module generates the operating power according to the RFID signal.

* * * * *